(12) United States Patent
Natanzon et al.

(10) Patent No.: US 10,938,674 B1
(45) Date of Patent: Mar. 2, 2021

(54) MANAGING UTILIZATION OF CLOUD COMPUTING RESOURCES

(71) Applicant: EMC IP Holding Company LLC, Hopkinton, MA (US)

(72) Inventors: Assaf Natanzon, Tel Aviv (IL); Oshry Ben-Harush, Kibbutz Galon (IL); Anat Parush Tzur, Be'er Sheva (IL); Idan Levy, Kadima-Zoran (IL); Amihai Savir, Sansana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 841 days.

(21) Appl. No.: 15/200,231

(22) Filed: Jul. 1, 2016

(51) Int. Cl.
 *H04L 12/24* (2006.01)
 *G06Q 30/04* (2012.01)
 *H04L 12/14* (2006.01)

(52) U.S. Cl.
 CPC ......... *H04L 41/5029* (2013.01); *G06Q 30/04* (2013.01); *H04L 12/1439* (2013.01); *H04L 41/5096* (2013.01)

(58) Field of Classification Search
 CPC ............. H04L 41/5029; H04L 12/1439; H04L 41/5096; G06Q 30/04
 See application file for complete search history.

(56) References Cited

U.S. PATENT DOCUMENTS

| | | | | |
|---|---|---|---|---|
| 2002/0146102 | A1* | 10/2002 | Lang | H04M 15/00 379/114.02 |
| 2009/0254382 | A1* | 10/2009 | Weeks | G06Q 10/02 705/5 |
| 2016/0231931 | A1* | 8/2016 | Feng | G06F 12/023 |
| 2016/0330083 | A1* | 11/2016 | Djukic | H04L 41/5006 |

OTHER PUBLICATIONS

Jianhui, Huang, "Pricing Strategy for Cloud Computing Services," Singapore Management University, 2013.*

* cited by examiner

*Primary Examiner* — Nathan Erb
(74) *Attorney, Agent, or Firm* — Dergosits & Noah LLP; Todd A. Noah (57) ABSTRACT

Methods and systems for managing the utilization of cloud computing resources are described. The system monitors cloud computing resource utilization for a first set of active jobs to determine real-time utilization data. The system compares the real-time utilization data with historic utilization data to generate a utilization pattern and determines future cloud computing resource utilization for at least one future time period based on the utilization pattern and a second set of scheduled jobs. The system further generates a pricing matrix for utilizing the cloud computing resources during a future time period based on the determined future cloud computing resource utilization. The pricing matrix includes prices associated with utilization of the cloud computing resources for each of the at least one future time period. The system transmits the pricing matrix to one or more devices requesting utilization of the cloud computing resources.

20 Claims, 9 Drawing Sheets

MANAGING UTILIZATION OF CLOUD COMPUTING RESOURCES

BACKGROUND

The present invention relates to the field of information technology, including, more particularly, to systems and techniques for managing the utilization of cloud computing resources.

Organizations look to their information technology (IT) department to plan, coordinate, and manage the computer-related activities of the organization. An IT department is responsible for upkeep, maintenance, and security of networks. This may include analyzing the computer and information needs of their organizations from an operational and strategic perspective and determining immediate and long-range personnel and resource requirements. Such management of computer-related activities of the organization is an increasingly difficult task because the modern workplace is a complex blend of multiple users and multiple applications that combine into a complex and dynamically evolving environment.

For these reasons and others, many companies are turning to cloud computing. Cloud computing is a general term for the delivery of hosted services over the Internet. Cloud computing enables companies to consume computer resources as a utility, just like electricity, rather than having to build and maintain computing infrastructures in-house. However, with the rising trends in the number of customers turning to the cloud for their computing needs, cloud service providers (CSP) are faced with a problem of providing enough resources to manage the needs of the clients while still maximizing profits and reducing waste. The ability of CSPs to efficiently host as many clients as possible on a fixed set of physical assets is crucial to the future success of their business. For that reason, there has been much research dedicated to developing optimum resource allocation strategies. For instance, many CSPs use concepts of Queuing Theory to maximize revenues and increase resource utilization levels while adhering to Service Level Agreement (SLA) constraints. Other CSPs employ a multivariate probabilistic model to optimize resource allocation. While these strategies have been shown to improve utilization, a high percentage of resources still sit idle at any given time. As a result, oversubscription of cloud services has become an appealing solution to further optimize cloud efficiency. However, the benefits of oversubscription in the cloud are not without inherent risks. Oversubscription can leverage under utilized capacity in the cloud, but can lead to overloading of a CSP's computer resources. A cloud provider must manage overload due to oversubscription for maximizing its profit while minimizing any service level agreement (SLA) violations.

Therefore, there is a need for a system and method for managing utilization of the cloud computing resources during peak and non-peak utilization periods so enough resources are available to manage the needs of clients while still maximizing profits and reducing waste.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides for managing utilization of cloud computing resources by dynamically pricing the cloud computing resources.

Time-dependent pricing (TDP) solves the issue of providing enough resources to manage the needs of the clients while still maximizing profits and reducing waste without the negative side-effects of the resource allocation and oversubscription strategies. Time-dependent pricing takes into consideration peak utilization periods of computer resources, in addition to how much is used. TDP leverages this traffic pattern to help CSPs reduce the cost of peak-load provisioning for their networks, while allowing users to save money by choosing the time of their usage.

According to an embodiment, a server associated with a CSP monitors cloud computing resource utilization for a set of active jobs to determine real-time utilization data, such as CPU usage, memory utilization, network traffic, and storage capacity. The real-time utilization data is stored along with historic utilization data associated with the utilization of cloud computing resources for past jobs. The server then compares the real-time utilization data with historic utilization data to generate a utilization pattern. Using the utilization pattern and a set of scheduled jobs, the server determines future cloud computing resource utilization for at least one future time period and generates a pricing matrix for utilizing the cloud computing resources during the future time periods based on the determined future cloud computing resource utilization. The pricing matrix includes prices associated with utilization of the cloud computing resources for each of the future time periods. The pricing matrix is transmitted to one or more devices requesting utilization of the cloud computing resources. Based on the pricing matrix, a customer has the choice of reducing a cost associated with the computing resource for utilization of a computing resource that occurs during the future periods of time.

Prior to describing the subject matter in detail, an exemplary hardware device in which the subject matter may be implemented shall first be described. Those of ordinary skill in the art will appreciate that the elements illustrated in FIG. 1 may vary depending on the system implementation. FIG.

Figure 1:
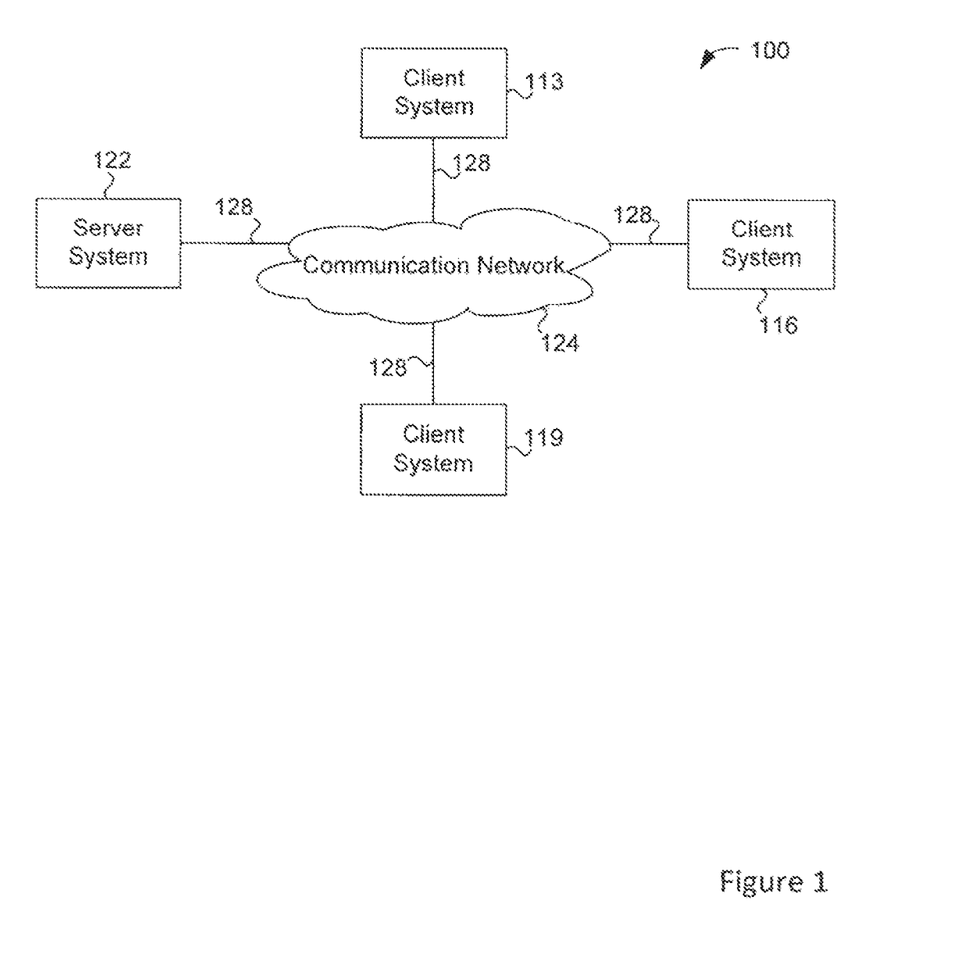
FIG. 1 shows a block diagram of a client-server system and network in which an embodiment of the invention may be implemented.

1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft® Corporation, and the Firefox® browser provided by Mozilla® Foundation, and others.

Figure 2:
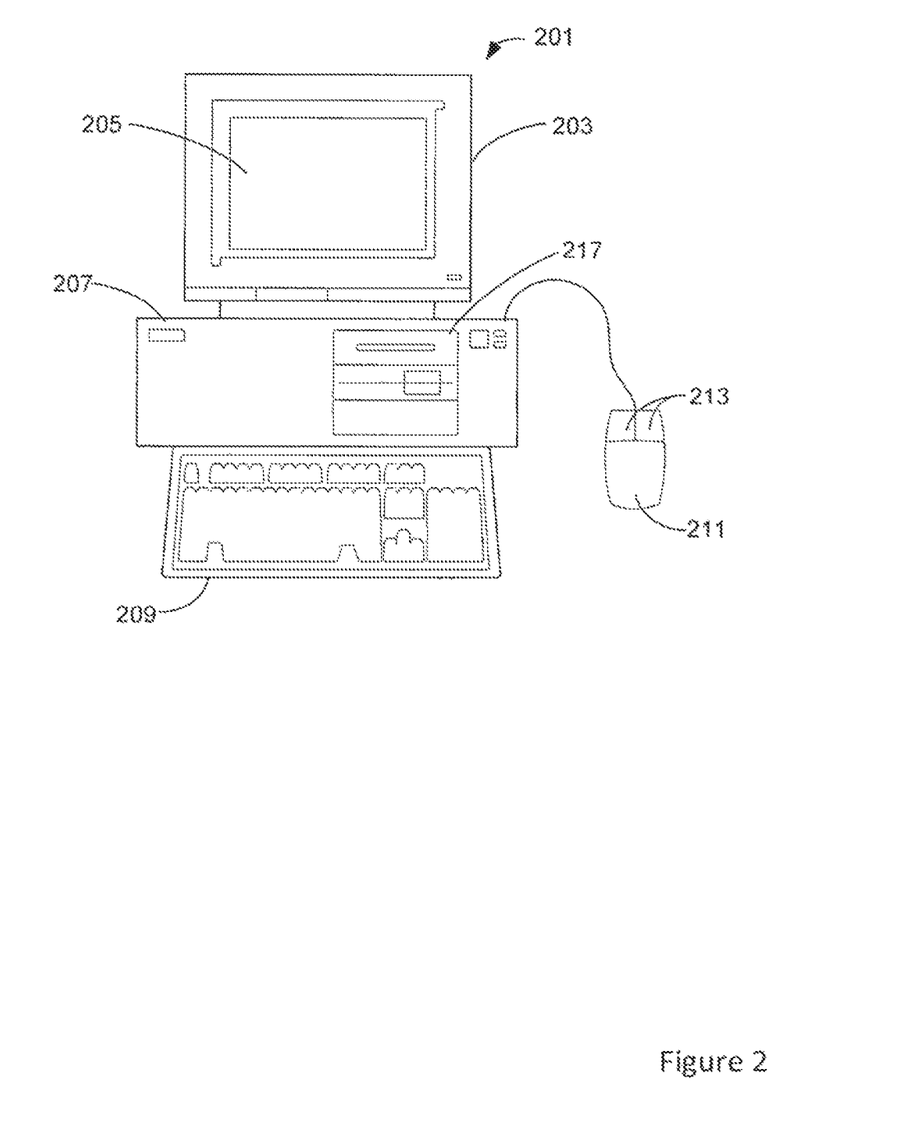
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
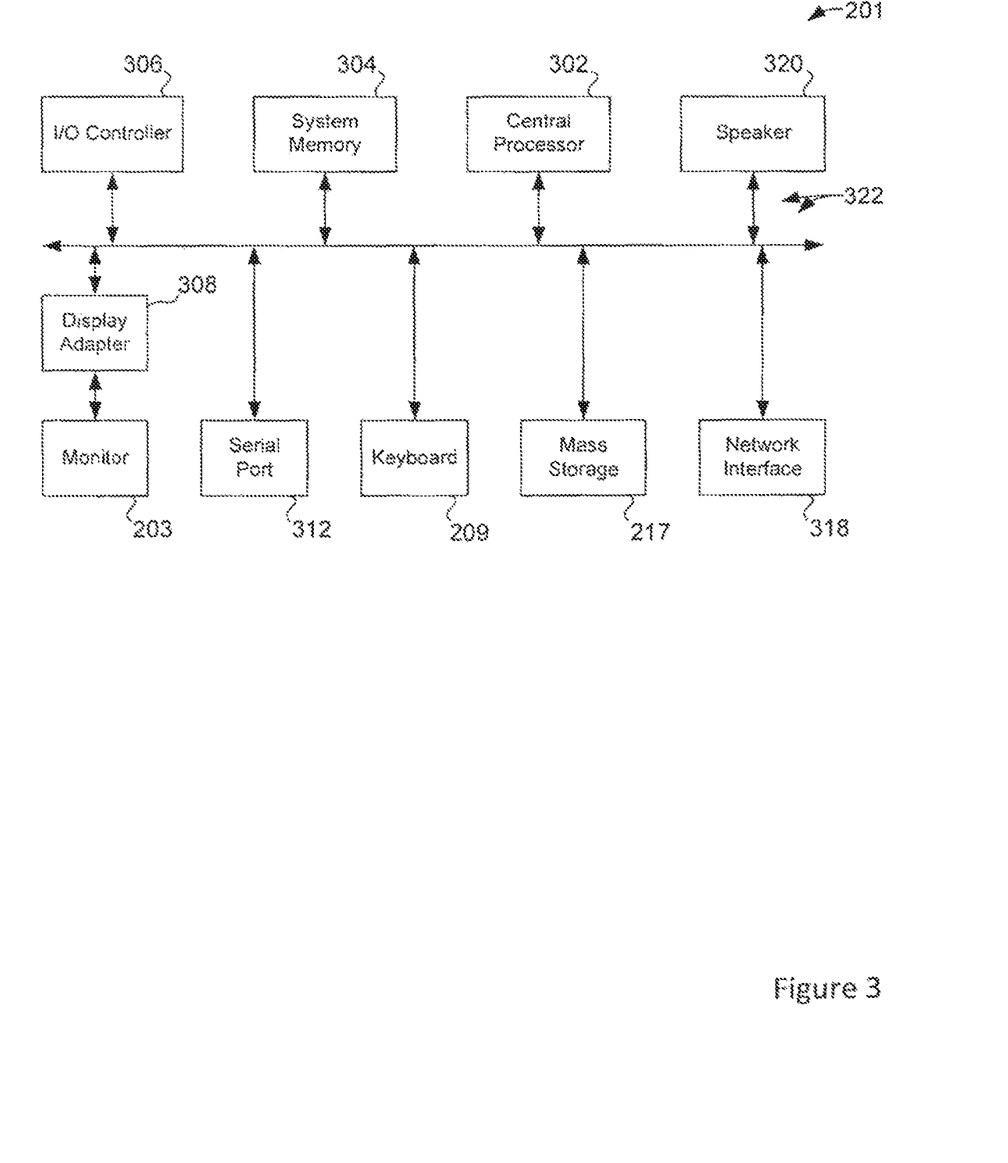
FIG. 3 shows a system block diagram of a client computer system which may be used in an implementation of the invention.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
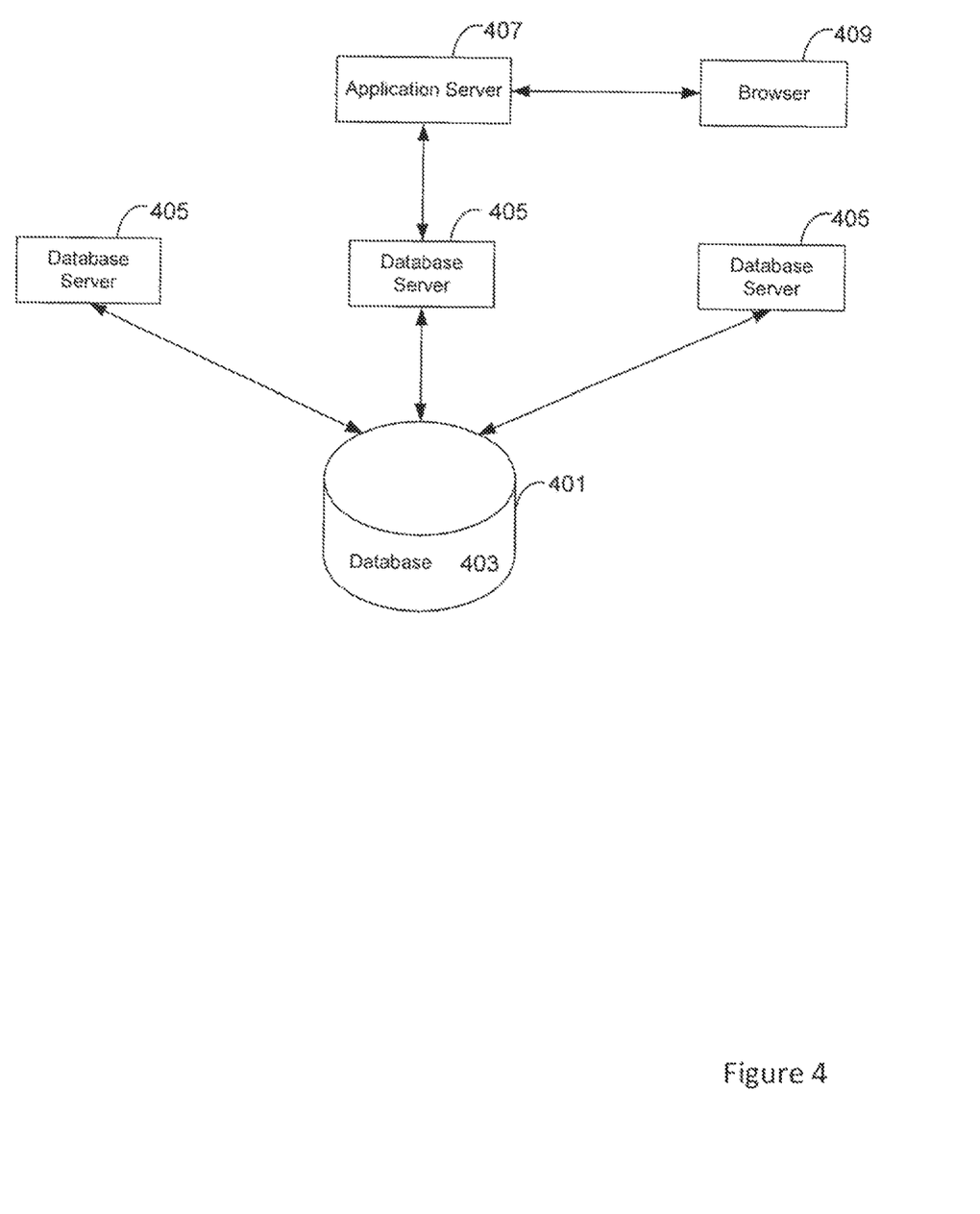
FIG. 4 shows a data source or data service in the form of a database system which may be used in an implementation of the invention.

As discussed above, a CSP is a company that offers some component of cloud computing having a typically Infrastructure as a Service (IaaS), Software as a Service (SaaS) or Platform as a Service (PaaS) to other businesses or individuals. A CSP may offer customers storage or software services available via a private or public network. Usually, this means the storage and software is available for access via the Internet for the customers. To manage the storage and software services used by the different customers, the CSP uses a plurality of databases that are part of a database management system. For example, managing cloud computing resource utilization during peak and non-peak periods is part of managing the storage and software services offered by the CSP. Data associated with the utilization of the different computer resources by a plurality of clients must be stored on at least one database of the database management system so that the data can be efficiently mined to generate predictions about the future cloud computing resource utilization. One suitable database management system architecture is a three-tiered architecture as illustrated in FIG. 4.

The core of a database management system is located in a first tier of the three-tiered architecture. In the first tier, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

The CSP may store use any variety of formats to store utilization data, as long as the format allows for efficient data mining. For example, in order for a CSP to generate a pricing matrix based on a utilization pattern, a server associated with the CSP must monitor and store utilization data. Real-time utilization data may be stored in a first table in the database or repository 403 and historic utilization data may be stored in a second table in the database or repository 403. Data mining techniques may be used to map the real-time utilization data from the first table to the historic utilization data correlate the data based on time periods. Once the data has been correlated, the CSP may generate a future cloud computing resource utilization prediction.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces. For example, a user interface associated with the database server 405 may be used by an agent of the CSP to mine data from the real-time and historic cloud computing resource utilization data that is stored in the first tier databases so that the CSP may determine correlations amongst the data to generate a utilization pattern and a pricing matrix.

The third tier is an application server 407. There may be multiple application servers. In an implementation, the application server 407 provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser is utilized to access the 409 application server. For example, an interface may be used to receive requests for utilization of cloud computing resources and transmit pricing matrices generated based on the utilization pattern.

Figure 5:
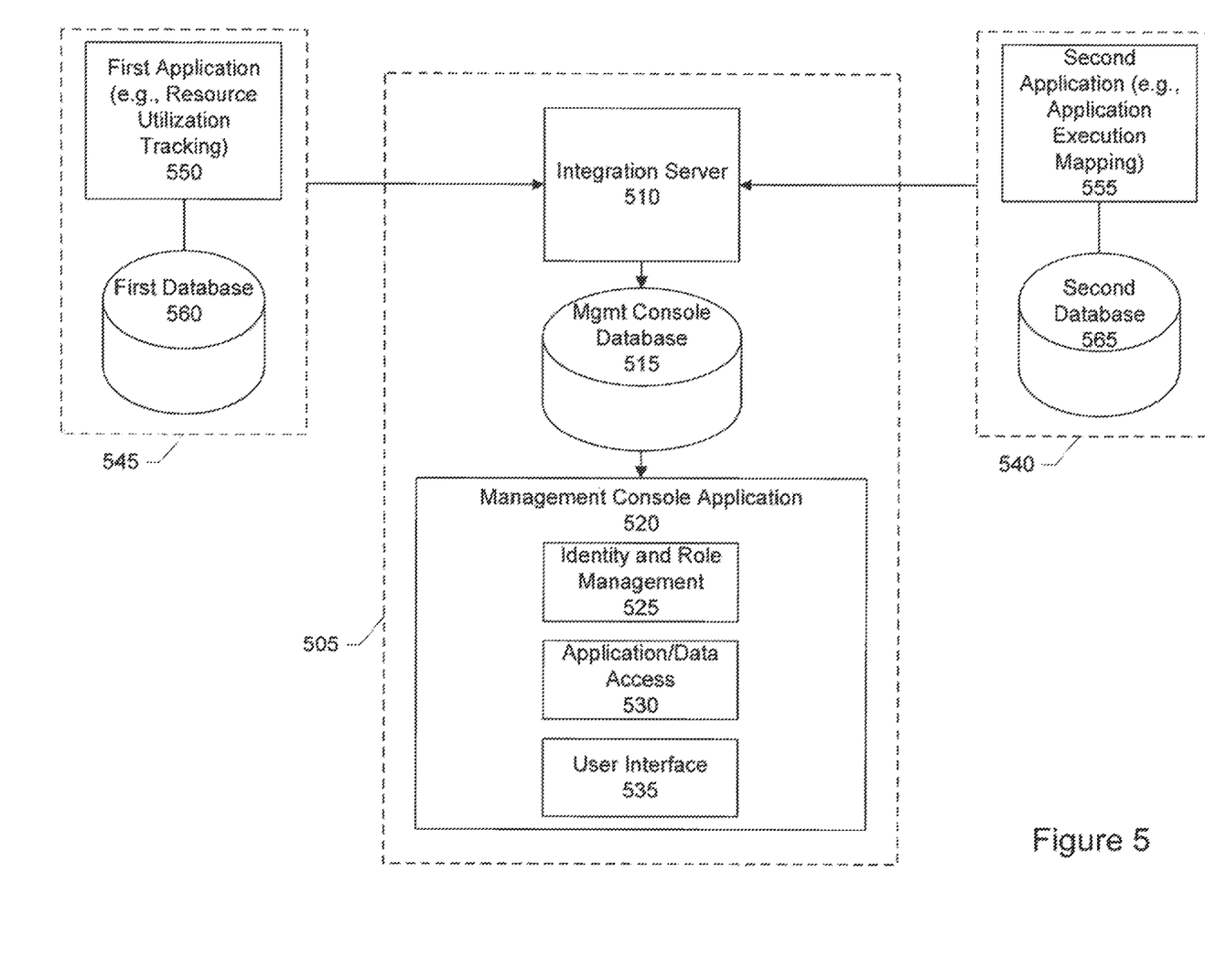
FIG. 5 shows a block diagram of an environment in which a management console system that collects data from other systems which may be used in an implementation of the invention.

FIG. 5 illustrates the databases discussed in FIG. 4 within a larger cloud system. Systems 540, 545 and 505, form a management system for the CSP. In a specific implementation, the system includes an integration server 510, a management console database 515 coupled to the integration server, and a management console application 520 coupled to the database. The management console application includes several subsystems, components, modules, or interfaces such as an identity and role management component 525, an application/data access interface 530, and a user interface component 535.

In a specific implementation, the system 505 provides a central cloud management console which streamlines formerly complex, time consuming, and error prone operations. In a specific implementation, the system communicates with external systems 540, 545, or both and presents the data generated by the systems through a single cloud management application program. The example of FIG. 5 shows two external systems. It should be appreciated, however, that there can be any number of external systems coupled to central cloud management system 505, such as one, two, three, four, five, or more than five systems. In another specific implementation, systems 540, 545 or both are combined into a single management console system 505.

In a specific implementation, a first application 550 from system 545 includes a cloud resource utilization tracking application. A second application 555 from system 540 includes an application execution mapping application. Resource reservation such as scheduled jobs, tracking, and billing, as well as application and infrastructure mapping, control, and monitoring are typically orders of magnitude more complex in a cloud environment than in a data center running well-controlled applications.

Thus, this specific implementation provides a centralized management console or system with high availability on a distributed system. In this specific implementation, the management console includes an identity management system for centralized authentication and authorization or role management. There can be a single console to access different applications through web services, application specific plug-ins, or both. This system can manage the data flow on the cloud from within the application and to/from the external applications to manage the complete workflow (e.g., request for service, such as utilization of a computing resource). There can be a single window with user-specific roles and permissions for the workflow for many different departments such as sales, IT, management, or services.

The management console can act as a dashboard providing information on storage, network, utilization of resources, and helps to track resources such as virtual machines, storage, and the like on the cloud more efficiently. The console can act as a backbone to complete a business workflow and can help to minimize or reduce cost and time and increase quality. Centralizing cloud management can increase security which is desirable in cloud offerings. Having a centralized management console can reduce the number of different applications an organization may have, reduce maintenance difficulties and turnaround "time to customer," for providing a service, resolving a problem, or both. This can help to improve the "Total Customer Experience." In a specific implementation, there is a single management console for the private cloud, with monitoring and configuration of clustering, load balancing and high availability, server load reporting, and in general cloud inventory and load (e.g., network, routers, applications, and so forth). There may be a distributed mapping infrastructure providing dynamic maps of application execution, resource usage, user activity tracking or general cloud map. Dynamic mapping can be a building block for the management console and the resource tracking services.

In a specific implementation, the centralized management console system obtains data from external systems such as cloud resource utilization tracking 550 or application execution mapping 555, or both. The system may be web-enabled. In this specific implementation, data integration from the one or more different external systems is provided through integration server 510. Integration server 510 may be referred to as a web method integration server. This server can push data to management console application database 515 running this console through database insert/update triggers from the other external system databases, such as databases 560 and 565.

As discussed above, a specific implementation of the system is with cloud resource utilization and tracking and application execution mapping. It should be appreciated, however, that the system may instead or additionally communicate with other types of applications such as customer relationship management (CRM) applications, supply chain management applications, risk and compliance management applications, and so forth.

A feature of system 505 includes "always-on" connectivity using clustered high-availability (HA) environments to help ensure no downtime for the cloud or private cloud. There can be load balancers, firewall setup and security settings for authentication and authorization. In a specific embodiment, system 505 is implemented using VMware for virtualization.

"Always-on" connectivity can help to ensure business continuity. As organizations move services to the cloud, the majority of the organization's and customer's critical business data is stored in the cloud. So, network downtime can shut down business operations. It is desirable that access to cloud services be available even during maintenance. Thus, cloud services as described in this application may implement high availability technologies and capabilities such as active/active clustering, dynamic server load balancing and ISP load balancing within the network infrastructure. A centralized management and network system built with network architecture for cloud services can help business continuity which is desirable for many organizations.

The "always-on" connectivity also helps the organization or the customer save money by not limiting usage of the cloud resources to peak periods. A dynamic cloud resource utilization monitoring and pricing method based on peak and non-peak periods will be described below in more detail.

The identity and role management component 525 provides authentication and authorization to each of the intercommunicating applications. The centralized management console may be a web application which provides role-based access to applications. In a specific implementation, the component provides single sign-on (SSO) access. Single sign-on (SSO) is a property of access control of multiple related, but independent software systems. Through the SSO feature, a user can log in once and gain access to all systems without being prompted to log in again at each of them. A single sign-on configuration may include prompting the user for a user name and password, be based on Kerberos, smart card, one-time password (OTP) token, integrated Windows authentication, or combinations of these. In a specific implementation, authentication is via a biometric authentication. Biometric authentication includes techniques for recognizing humans based upon one or more intrinsic physical or behavioral traits. Some examples of biometric characteristics include fingerprint, face recognition, DNA, palm print, hand geometry, iris recognition, typing rhythm, or voice.

Figure 6A:
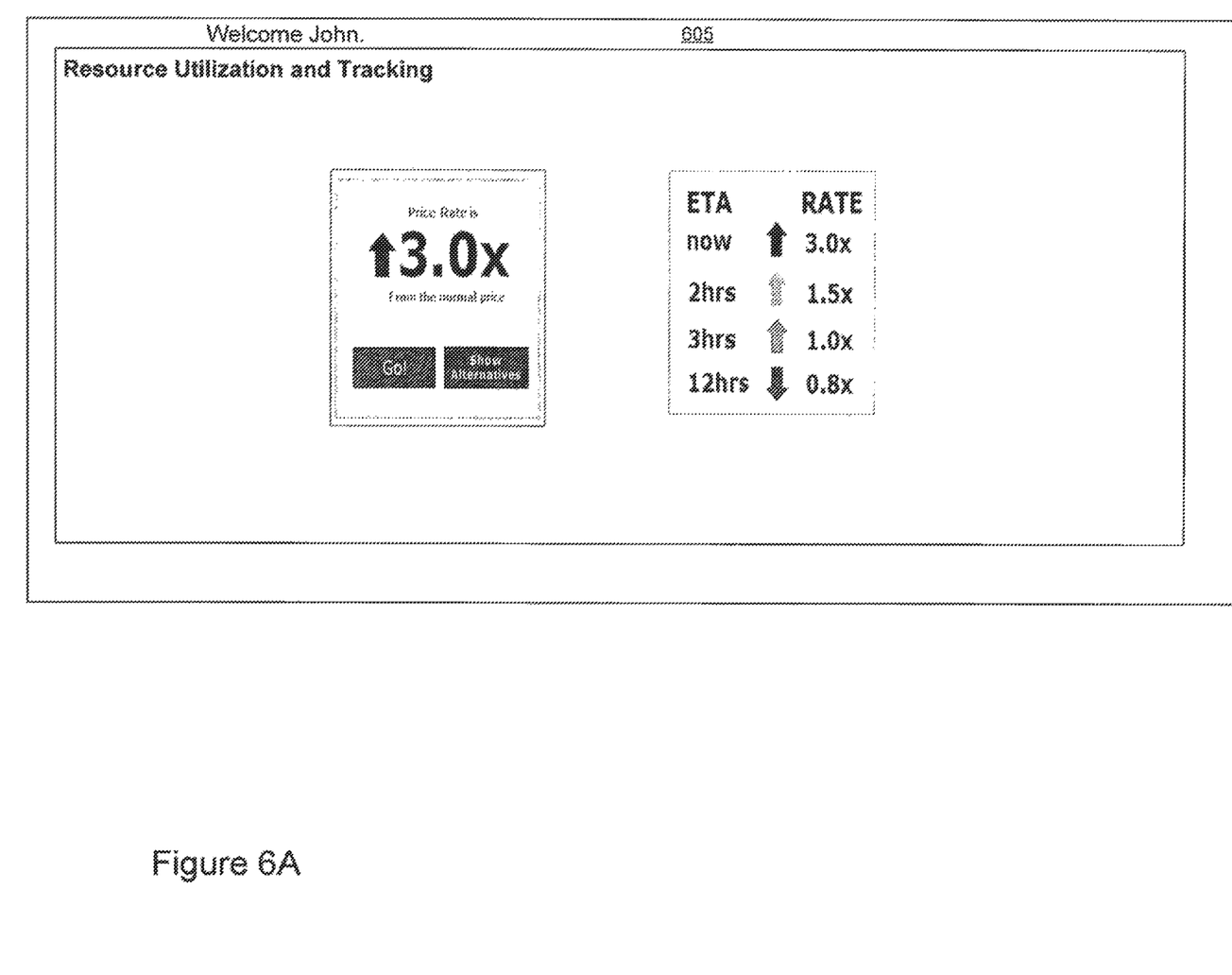
FIG. 6A-6B shows an example Graphical User Interface that may be used in an implementation of the invention.

User interface 535 provides a graphical user interface (GUI) through which a user can interact with the management console application. FIG. 6A shows an example of a GUI 605 that may display a pricing matrix having different prices for utilizing resources in different future time periods.

According to an embodiment, a server associated with a CSP monitors cloud computing resource utilization for a set of active jobs to determine real-time utilization data, such as CPU usage, memory utilization, network traffic, and storage capacity. The real-time utilization data is stored along with historic utilization data associated with the utilization of cloud computing resources for past jobs. The server then compares the real-time utilization data with historic utilization data to generate a utilization pattern. Using the utilization pattern and a set of scheduled jobs, the server determines future cloud computing resource utilization for at least one future time period and generates a pricing matrix for utilizing the cloud computing resources during the at least one future time period based on the determined future cloud computing resource utilization. The pricing matrix includes prices associated with utilization of the cloud computing resources for each of the at least one future time period. The pricing matrix is transmitted to one or more devices requesting utilization of the cloud computing resources. Based on the pricing matrix, a customer has the choice of reducing a cost associated with the computing resource for utilization of a computing resource that occurs during the future period of time.

In one embodiment, as illustrated in FIG. 6A, the GUI may display only either a default price of the cloud computing resources utilization or a surge increase rate for the cloud computing resource utilization and provide a link to accept the default price or the surge rate and utilize the cloud computing resource immediately. In this embodiment, the GUI may also include a link to show alternatives times and a price matrix associated with the times for utilizing the cloud computing resource. In one embodiment, the price matrix is displayed in a table format having the alternative times and the prices or rates associated with those alternative times. The rate would be a measure, quantity, or frequency measured against the default or normal price. Alternatively, the alternative times and prices/rates associated with those times may be displayed in another user interface.

Figure 6B:
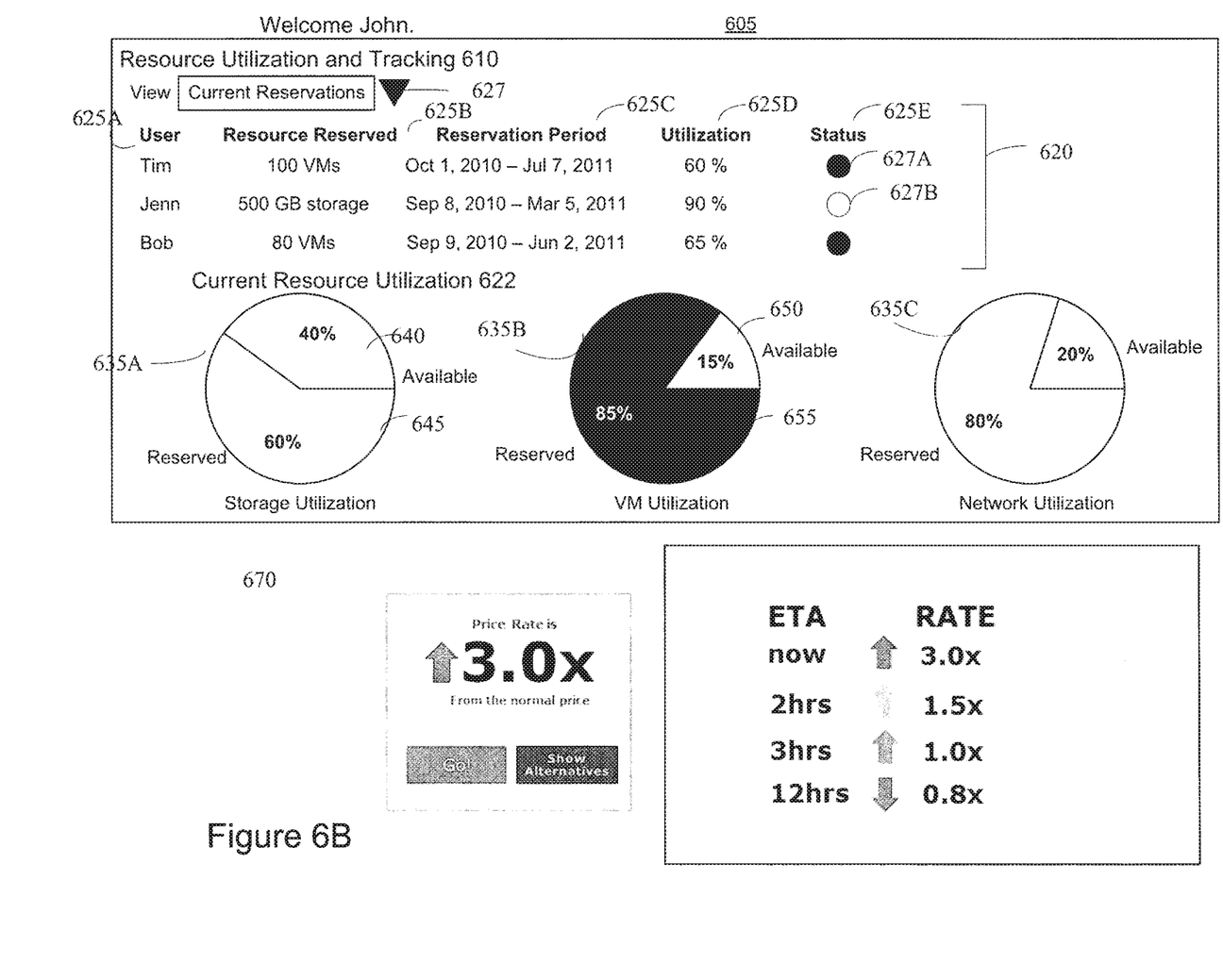

In another embodiment, as illustrated in FIG. 6B, the GUI may display information relating to current and/or historical cloud computing resource utilization data. The interface may be referred to as a display, view, window, or dashboard. In a specific implementation, the interface includes a web page that is displayed within a browser. The interface may include graphical icons, elements, visual indicators, controls, user-controls, widgets, and the like.

The GUI, as illustrated in FIG. 6B, may be displayed as a Web page within a browser window and may be an interactive dashboard 605. The interactive dashboard 605 may display information for a centralized management console. The centralized management console may be an application that allows administrators of the CSP as well as customers of the CSP to retrieve information relating to the utilization of the computer resources. For example, a user may be able to click on an element to drill-down and see detail information or drill-up to see summary information. User-input controls may be provided which allow for sorting and filtering. This example of the dashboard 605 includes a resource utilization and tracking section 610 and a pricing section 670.

The pricing section 670 of the dashboard 605 includes a price for immediately submitting and processing a job. The price may be in the form of dollars, but also may be in the form of a rate. For example, as shown in the pricing section 670 of the dashboard 605, the current rate for submitting and processing a job would be three times higher than the normal or default price. The pricing section 670 may also include a price matrix which indicates the price or rate of submitting and processing a job at future times. For example, as shown in the pricing section of the dashboard 605, the future rate at 2 hours from now for submitting and processing a job will be 1.5 times higher than the normal or default price. This information incentives the customer from choosing a non-peak period to submit and process the jobs.

The resource utilization and tracking section 610 includes a table 620 and a set of charts 622. Table 620 includes columns 625A-F. Column 625A lists users. Column 825B identifies the resources reserved by the users. Column 625C identifies the period for which the user reserved the resource. Column 625D displays metrics indicating utilization of the resource. Column 625E displays status to indicate whether or not utilization of the resource has fallen below a threshold level. The table 620 may include a user-input control 627 that allows the user to select a particular view or filter to, for example, view current job reservations, view upcoming job reservations, view job reservations for a particular time period, show under-utilized resources, show resources by resource type (e.g., virtual machines versus storage), show resource reservations by user, show resource reservations by department, and so forth.

The dashboard data may be customized for a particular user or user role. In this example of the dashboard 605, there is a user "John" who is a CSP customer. Upon logging into the centralized management console application, dashboard 605 is displayed showing the various resources that the customer "John" is responsible for and the status of those resources. In another embodiment, the centralized management console application may be customized and displayed for users employed by the CSP.

In one embodiment, the customer associated with a company can see the resources reserved by other customers associated with the same company. For example, as shown in a first row of the table 620, the customer "John" can see that there is a user "Tim" who has reserved virtual machines for the period Oct. 1, 2010 to Jul. 7, 2011. The customer can further see that Tim's current utilization of the resource is 60 percent. The utilization may be calculated as a ratio of an amount of resources used to an amount of resources reserved. As shown in a second row of the table 620, the customer "John" can see that there is a user "Jenn" who has reserved 500 GB of storage for the period Sep. 8, 2010 to Mar. 5, 2011. The customer can further see that Jenn's current utilization of the resource is 90%. In another embodiment, the customer associated with a company may see the resources reserved for other customers associated other companies that are utilizing the CSP's cloud computing resources.

Regarding user Tim, as shown in the first row of the table 620, a 60 percent utilization may be below a threshold utilization level. For example, a CSP may set a policy that users have at least 80 percent utilization of resources that they reserve. This can help to encourage efficient use of resources. In this example, a utilization of 60 percent is below the 80 percent threshold utilization level. Thus, status 625E displays a particular visual indicator to indicate that utilization is below the threshold level. In this example, the status column 625E includes visual indicators 627A and 627B. Visual indicator 627A can be colored red and can indicate that usage of the reserved resource has fallen below the threshold utilization level. A green visual indicator 627B can indicate that usage of the reserved resource is above the threshold utilization level. The visual indicator can be in different forms, including a color (e.g., red or green), shape (e.g., square, triangle, or circle), text, icon, pattern, shade, or combinations of these.

Charts 622 provide a graphical summary of current resource utilization such as utilization of storage, virtual machines, or network bandwidth. Such resource utilization may displayed in the dashboard of a CSP customer. As shown in FIG. 6B, there can be a first chart 635A, second chart 635B, and a third chart 635C. It should be appreciated, however, that there can be any number of charts. In this example the charts are pie charts. However, there may instead or additionally be other types of charts such as bar charts, graphs (e.g., line graphs), and the like.

In this specific implementation, first chart 635A is a pie chart that summarizes utilization of storage. Chart 635A includes first and second slices 640 and 645, respectively. The first slice 640 corresponds to the portion of total storage that is available or unreserved. The second slice 645 corresponds to the portion of total storage that has been reserved. In this example, 60 percent of the organization's storage has been reserved and 40 percent is available (e.g., available for users to reserve). The shading of the second slice 645 for reserved resources may be used to indicate whether or not the reserved resources are being used efficiently. In FIG. 6B, the second slice 645 is shown not shaded (unfilled) to indicate the resources are being used efficiently. If the reserved resource was being used inefficiently, the second slice 645 may be shaded differently to indicate that the reserved resource is being used inefficiently. For example, the second slice 645 may be shaded (i.e. filled) with a dark color indicating the resources are being used inefficiently.

As a further example, consider second chart 635B which summarizes utilization of virtual machines. A third slice 650 corresponds to the portion of total virtual machines that are available. A fourth slice 655 corresponds to the portion of virtual machines that have been reserved. In this example, the fourth slice 655 is shaded a dark color to indicate that the reserved resource (e.g., virtual machines) are being used inefficiently. If the reserved resource was being used efficiently, the fourth slice 655 would be shaded a different color or not shaded (unfilled). Resource utilization and tracking is further described below in the discussion accompanying FIGS. 7-8.

Figure 7:
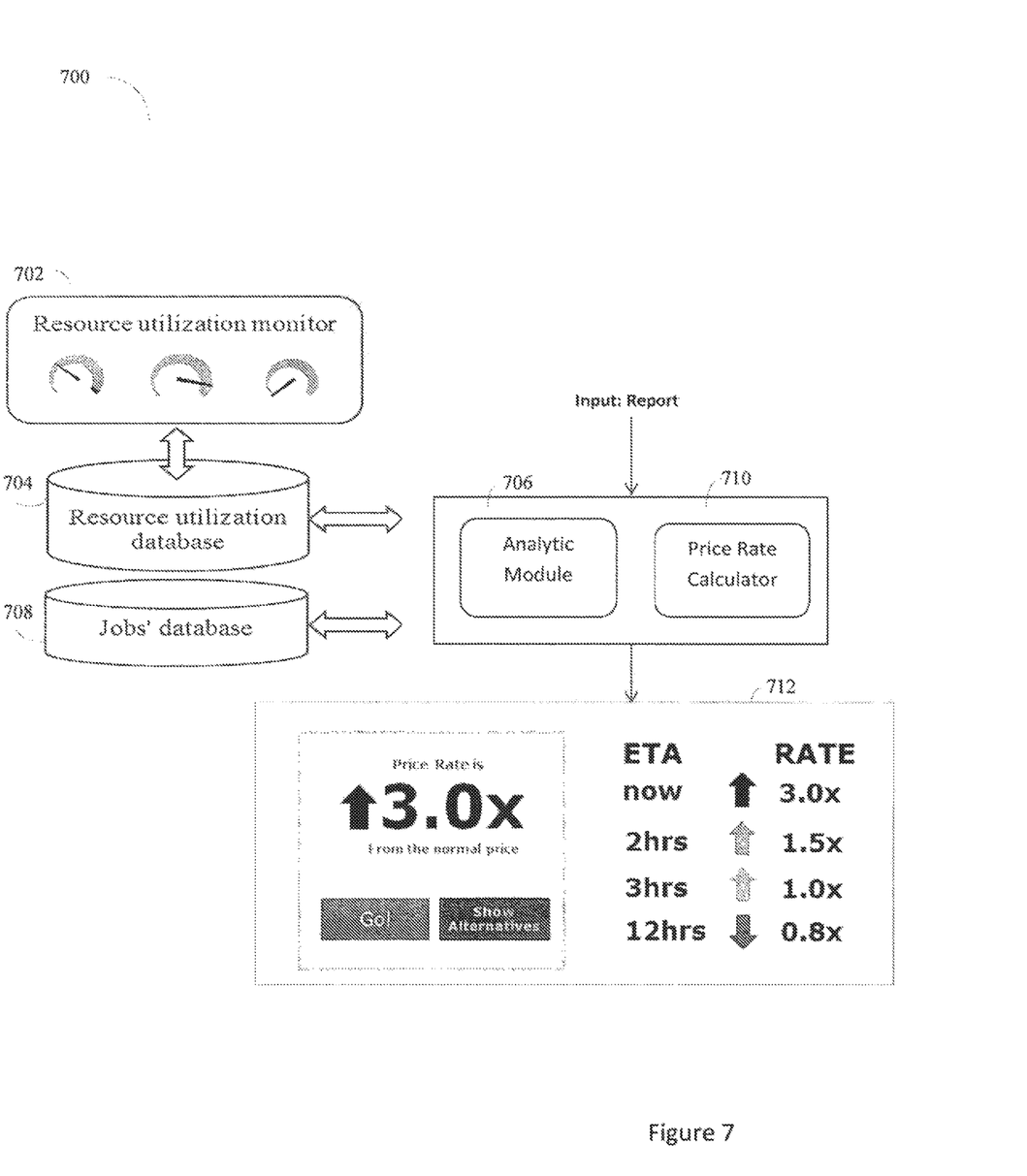
FIG. 7 shows a system diagram that illustrates a method of dynamically pricing utilization of cloud resources which may be used in an implementation of the invention.

The charts and graphs related to the GUI are generated by the system illustrated in FIG. 7. FIG. 7 is a block diagram of a system that implements dynamic pricing of cloud computing resources, under an embodiment. The system 700 may illustrates a cloud computing environment in which data, applications, services, and other resources are stored and delivered through shared data-centers and appear as a single point of access for the users. The system 700 may also represent any other type of distributed computer network environment in which servers control the storage and distribution of resources and services for different client users.

In an embodiment, the system 700 represents a cloud computing system that includes a resource utilization monitor 702. The resource utilization monitor 702 monitors different key performance indicators such as CPU usage, memory utilization, network traffic and storage capacity. Data associated with the key performance indicators are stored in a resource utilization database 704. In one embodiment, the utilization data is monitored at predetermined periods. A resource utilization database 704 includes a predetermined number of present value buffers that store the present value for each key performance indicator in time series. The resource utilization database 704 performs, when the present value is acquired, a control for storing data in the present value buffers. A calculating unit, not shown in the system diagram, within the resource utilization monitor 702 calculates a period representative value of the monitoring period based on the present value. Thereafter, the resource utilization database 704 can maintain real-time utilization data and historic utilization data from a previous time period.

The system 700 also may include an analytic module 706. The analytic module 706 retrieves utilization data from the resource utilization database 704 determines trends and seasonality patterns in the utilization of the cloud computing resources using the real-time utilization data and the historic utilization data. For example, the analytic module 706 may determine utilization of 90% of the cloud computing resources occurs Monday to Friday from 11:00 am to 3:00 pm. The analytic module 706 may also determine that this trend occurs only in the months of September-May.

The analytic module 706 may also use the determined trends and seasonality patterns to formulate a prediction of the status of the cloud environment in a future time period. The analytic module 706 may retrieve, from the job schedule database 708, a scheduled job report for a future time period. The analytic module 706 may apply the utilization usage patterns to the scheduled job report to predict the utilization of computer resources based on the future dine period. The scheduled job report may include a set of jobs that have been submitted to a queue for processing by the cloud computing resources at a future time. The scheduled job report stay also include anticipated jobs. Anticipated jobs are jobs which customers have inquired about submitting to the queue. For example, as described above, a customer may submit a job to be processed by the cloud computing resources during a certain time period. Prior to submitting the job, the customer may be given the option of choosing several different time periods, wherein each time period has an associated price. When the customer inquires about a certain time period, the job the customer will potentially submit to the queue would be an anticipated job.

As further shown in FIG. 7, system 700 may also include a price rate calculator 710. The price rate calculator 710 determines a plurality of prices for future cloud computing resource utilization for a plurality of time periods. This determination is based at least in part on the generated utilization pattern and the scheduled or anticipated jobs. The price rate calculator 710 may store a default price value for the utilization of the cloud computing resource. Based on the predicted utilization of the cloud computing resource of the future time period, the price rate calculator 710 may adjust the price. The price may be adjusted to increasing the price as compared to the default price or decreasing the price as compared to the default price for a duration of time. For example, a set of jobs are scheduled to run on Monday-Wednesday from 11:00 am to 1:00 pm in the first week of May. The analytic module 706 may determine that the utilization of the computer resources will be at 90% based on an analysis of the utilization usage patterns and the set of schedule jobs. Since the computer will be running at peak capacity 11:00 am to 1:00 pm, the price rate calculator 710 may reduce the pricing rates for the times intervals prior to 11:00 am and after 1:00 pm. In one embodiment, the prices for different time intervals may vary based on the determined cloud computing resource utilization at a particular time interval. For example, from 11:00 am to 1:00 pm, the price rate may be 3.0× the default price. In 2 hours, the price rate may drop to 1.5× the default price. In 3 hours, the price rate may drop to 1.0× the default price.

In one embodiment, when the customer inquires about submitting a job for processing by the cloud computing resources, the customer is provided a price matrix comprising the prices or rates for different time intervals, as described above. Once the user has received the prices or rates, the price or rate because a fixed rate for the job the customer inquired about. Additionally, the job the customer inquired about may then become noted as an anticipated job. The anticipated job may then be used in conjunction with the scheduled jobs to predict the future cloud computing resource utilization.

In one embodiment, the price rate calculator 710 may adjust the price based on whether the predicted utilization of a cloud computing resource is above or below a threshold value during a certain time interval. For example, if the predicted future cloud computing resource utilization at a certain time period is above a threshold amount, the price rate calculator 710 will generate a surge price for that time period. In one embodiment, when there is a price surge, the customer can receive a notification of the increase or decrease in price. The notification in some instances may be related to the inquiries the customer makes for scheduling a job for processing by the cloud computing resources. The notification may be a text alert, an e-mail, a pop-up notification, or the like.

Once the price data associated with the future time period has been determined, a price matrix may be generated and transmitted to the customer so that the adjusted price can be displayed on at least one of the one or more devices requesting utilization of the cloud computing resource. A report indicating the pricing matrix may also be generated and sent to the customer.

In one embodiment, when a user of the one or more devices interacts with their respective requesting device to order the utilization of the cloud computing resources for a job, the pricing matrix corresponding to the request can be provided over the network to the device interface 712. The device interface 712 may notify the CSP, so that the one or more CSP may store the information that may be used to determine an anticipated job schedule.

In another embodiment, once the necessary information associated with the job request is exchanged between the CSP and a user, the device interface 712 then may provide the transaction request. The transaction request notifies the CSP that a job has been scheduled. In one embodiment, the CSP can handle the financial processing of user. The dynamically adjusted price associated with the time the job has been scheduled at the time of the transaction is determined and the CSP may generate a bill or connect with the financial institutions (e.g., banks, credit card companies, etc.) to charge an account associated with the user. In one embodiment, the device interface 712 may display the associated bill and/or a confirmation that the job has been scheduled.

Figure 8:
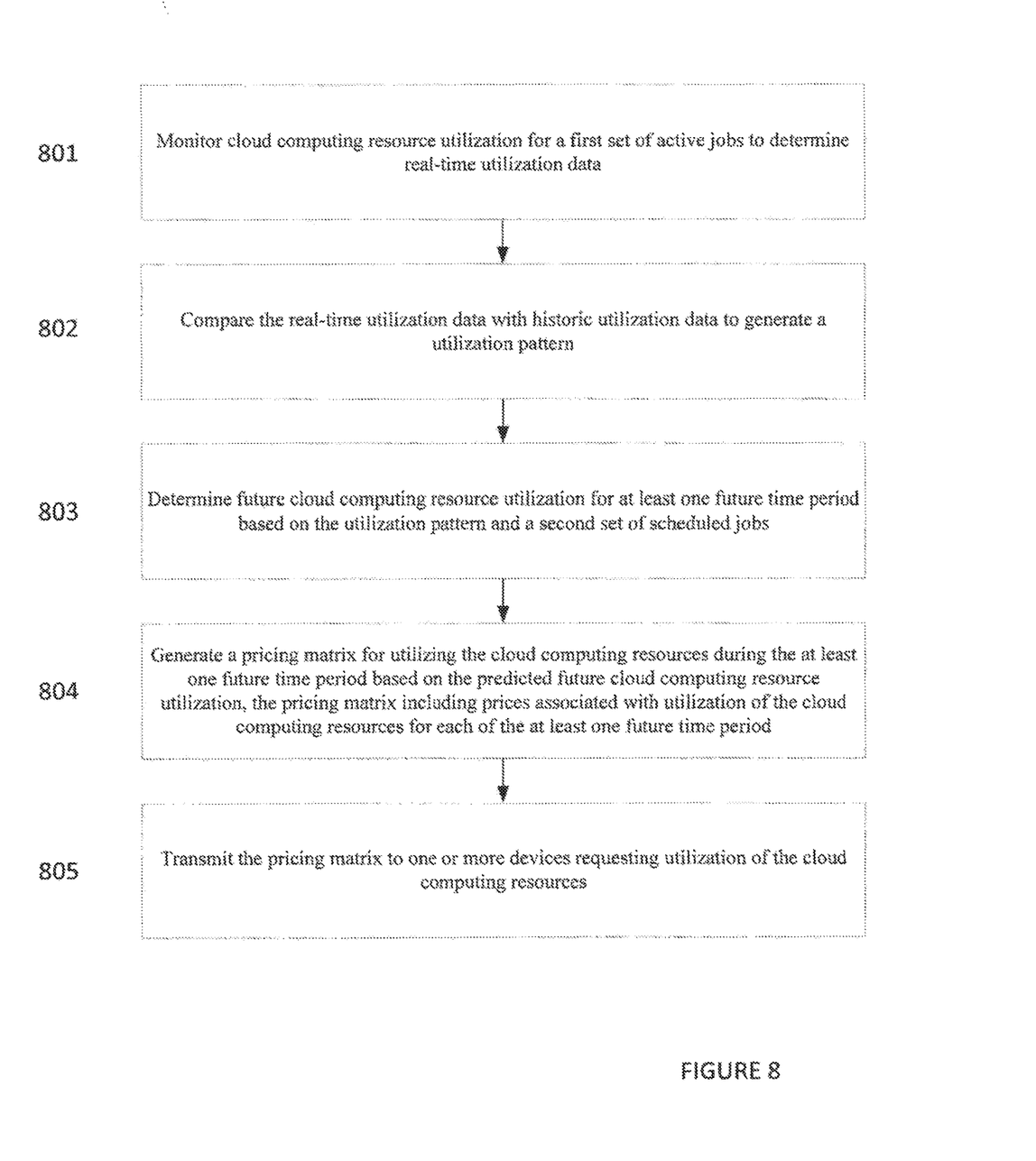
FIG. 8 shows a flowchart that illustrates a method of dynamically pricing utilization of cloud resources which may be used in an implementation of the invention.

FIG. 8 is a flowchart that illustrates a method for dynamic pricing of cloud computing resources. Flowchart 800 illustrates method acts illustrated as flowchart blocks for certain steps involved in and/or between the client and/or the servers of FIG. 7.

In step 801, a server, associated with the cloud service provider, monitors cloud computing resource utilization for a first set of active jobs to determine real-time utilization data. For example, the cloud service provider may monitor key performance indicators such as CPU usage, memory utilization, network traffic and storage capacity for a first set of active jobs that have been submitted by a plurality of users or companies. In one embodiment, the first set of active jobs may defined by a set of jobs that are being currently processed by the cloud computing resources and/or in a queue awaiting to be processed by the cloud computing resources during a defined period of time. The real-time utilization data maybe stored in a database and associated with the defined time period. In one embodiment, the real-time utilization data may be stored in a database and associated with a time stamp of when the data was gathered. The database may also store historic utilization data for past time periods.

In step 802, the server compares the real-time utilization data with historic utilization data to generate a utilization pattern. The cloud service provider determines utilization patterns based on the real-time utilization data and the historic utilization data, such as trends associated with the period of time or seasonality patterns. For example, the trends or patterns may be seasonal, non-seasonal, non-seasonal with additive seasonality, seasonal with multiplicative seasonality. In one embodiment, the system may generate graphs regarding the trends, such as constant graphs, linear graphs, exponential graphs, damped graphs and polynomial graphs.

In one embodiment, both the real-time utilization data and the historic utilization data are normalized. Normalization is one of the important pre-processing strategies which have a significant impact on forecast accuracy. Data normalization has a significant impact on the performance of any model because the sole purpose of data normalization is to guarantee the quality of the data before it is fed to any model.

The patterns or trends may be determined using statistical trend analysis techniques or mathematical algorithms. Statistics trend analysis often refers to techniques for extracting an underlying pattern of behavior in a time series which would otherwise be partly or nearly completely hidden by noise. For example, a utilization pattern maybe determined using regression analysis, Naïve forecasts or trends, moving averages, weighted moving averages, single exponential smoothing, and double exponential smoothing.

In step 803, the server determines future cloud computing resource utilization for at least one future time period based on the utilization pattern and a second set of scheduled jobs. The second set of scheduled jobs is a set of jobs that are currently in a queue for a future time period. In one embodiment, the set of scheduled jobs may include jobs in a queue for a future time period, as well as anticipated jobs. Anticipated jobs are jobs that may be submitted or scheduled in the queue of scheduled jobs at some time in the future. Anticipated jobs may be determined based on the number of inquiries received from a users or companies for utilizing the computer resources to process jobs at a particular time in the future.

In step 804, the server generates a pricing matrix for utilizing the cloud computing resources during at least one future time period based on the predicted future cloud computing resource utilization. The pricing matrix may include prices associated with utilization of the cloud computing resources for each of the future time periods. Generation of a price matrix allows for delivery of different prices for different times having non-peak computer resource utilization and peak computer resource utilization without the need to stop, analyze, and negotiate each and every deal as the peak and non-peak utilization of the computer resource utilization time occurs.

In one embodiment, a price matrix accomplishes this feat by generating set of structured "cells" along its dimensions, for example, the time of day, week, month or year, the job size being inquired about and/or utilization for the job being inquired about. Various combinations of these dimensions produce thousands of unique cells. Appropriate price points are assigned to each cell in the matrix, and invoice prices are fetched from the matrix cells at the time a request for utilization of the computer resources for a job is received. This approach permits much more precise and targeted pricing than one-size-fits-all price lists. And, because it avoids any margin-eroding negotiations, the matrix business tends to enjoy higher overall profits than spot-bids or customer-specific agreements.

In step 805, the server transmits the pricing matrix to one or more devices requesting utilization of the cloud computing resources.

In one embodiment, the one or more devices requesting utilization of the cloud computing resources for a job receives the pricing matrix and displays the pricing matrix in a user interface. The pricing matrix may indicate an adjustment in price as compared to a default price. The requesting user and/or the service provider can operate their respective computing devices to view the pricing matrix and either choose to process the requested job at the current time or choose to schedule the job for processing at another time based on the prices indicated in the pricing matrix. For example, a user may select a link associated with a particular time frame and submit the job for processing at that time. In another example, the user may accept the current price by selecting a link to process the job.

Although FIG. 8 depicts the acts 801-805 occurring in a specific order, the acts 801-805 may occur in another order. Embodiments herein determine suitable paths for source devices to store backup data on a storage device, even when source devices in a network have different network topologies and differing protocols.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method comprising:
   monitoring, by a computing system, cloud computing resource utilization for a set of active jobs to determine real-time utilization data;
   generating, by the computing system, a utilization pattern by correlating the real-time utilization data with historic utilization data based on time periods;
   determining, by the computing system, future cloud computing resource utilization for at least one future time period by applying the generated utilization pattern to a set of scheduled jobs, the set of scheduled jobs including jobs submitted to a queue for processing during the at least one future time period and any anticipated jobs;
   generating, by the computing system, a pricing matrix for utilizing cloud computing resources during (1) the current time period based on the real-time utilization data and (2) the at least one future time period based on the determined future cloud computing resource utilization, the pricing matrix including a plurality of prices associated with utilization of the cloud computing resources for each of the at least one future time period, each of the plurality of prices corresponding to a different future time period;
   transmitting, by the computing system, the pricing matrix to one or more computing devices in response to a request to utilize the cloud computing resources for a job, the pricing matrix being displayed on the one or more computing devices with a link to the current time period and a link to each of the at least one future time period; and
   receiving, by the computing system, a selection of at least one of the link to the current time period or a link to one of the at least one future time period, wherein selection of the link to the current time period causes the job to be processed at the current time and wherein selection of the link to the one of the at least one future time period causes scheduling the job during the selected one of the at least one future time period.

2. The method of claim 1, wherein the pricing matrix includes at least one of an increased price and a decreased price in relation to a default price for a specific period of time.

3. The method of claim 1, wherein the real-time utilization data comprises at least one of CPU usage data, memory utilization data, network traffic data, and storage capacity data.

4. The method of claim 1, wherein future cloud computing resource utilization is predicted for a plurality of intervals making up the at least one future time period.

5. The method of claim 4, further comprising determining whether the future cloud computing resource utilization is above a predetermined threshold for at least one of the plurality of intervals.

6. The method of claim 5, wherein a price is adjusted only for the at least one of the plurality of intervals in response to a determination that the future cloud computing resource utilization is above the predetermined threshold.

7. A system comprising:
   one or more processors; and
   a non-transitory computer readable medium storing a plurality of instructions, which when executed by the one or more processors, will cause the one or more processors to:
   monitor cloud computing resource utilization for a set of active jobs to determine real-time utilization data;
   generate a utilization pattern by correlating the real-time utilization data with historic utilization data based on time periods;
   determine future cloud computing resource utilization for at least one future time period by applying the generated utilization pattern to a set of scheduled jobs, the set of scheduled jobs including jobs submitted to a queue for processing during the at least one future time period and any anticipated jobs;

generate a pricing matrix for utilizing cloud computing resources during (1) the current time period based on the real-time utilization data and (2) the at least one future time period based on the determined future cloud computing resource utilization, the pricing matrix including a plurality of prices associated with utilization of the cloud computing resources for each of the at least one future time period, each of the plurality of prices corresponding to a different future time period;

transmit the pricing matrix to one or more computing devices in response to a request to utilize the cloud computing resources for a job, the pricing matrix being displayed on the one or more computing devices with a link to the current time period and a link to each of the at least one future time period; and receive a selection of at least one of the link to the current time period or a link to one of the a at least one future time period, wherein selection of the link to the current time period causes the job to be processed at the current time and wherein selection of the link to the future one of the at least one time period causes scheduling the job during the selected one of the at least one future time period.

8. The system of claim 7, wherein the pricing matrix includes at least one of an increased price and a decreased price in relation to a default price for a specific period of time.

9. The system of claim 7, wherein the real-time utilization data comprises at least one of CPU usage data, memory utilization data, network traffic data, and storage capacity data.

10. The system of claim 7, wherein future cloud computing resource utilization is predicted for a plurality of intervals making up the at least one future time period.

11. The system of claim 10, wherein the plurality of instructions further cause the one or more processors to determine whether the predicted future cloud computing resource utilization is above a predetermined threshold for at least one of the plurality of intervals.

12. The system of claim 11, wherein a price is adjusted only for the at least one of the plurality of intervals having the predicted future cloud computing resource utilization above the predetermined threshold.

13. A computer program product, comprising a non-transitory computer-readable medium storing a computer-readable program code embodied therein which, upon execution by one or more processors, causes the one or more processors to perform steps comprising:

monitoring cloud computing resource utilization for a first set of active jobs to determine real-time utilization data;

generating a utilization pattern by correlating the real-time utilization data with historic utilization data based on time periods;

determining future cloud computing resource utilization for at least one future time period by applying the generated utilization pattern to a set of scheduled jobs, the set of scheduled jobs including jobs submitted to a queue for processing during the at least one future time period and any anticipated jobs;

generating a pricing matrix for utilizing cloud computing resources during (1) the current time period based on the real-time utilization data and (2) the at least one future time period based on the determined future cloud computing resource utilization, the pricing matrix including a plurality of prices associated with utilization of the cloud computing resources for each of the at least one future time period, each of the plurality of prices corresponding to a different future time period;

transmitting the pricing matrix to one or more computing devices in response to a request to utilize the cloud computing resources for a job, the pricing matrix being displayed on the one or more computing devices with a link to the current time period and a link to each of the at least one future time period; and receiving a selection of at least one of the link to the current time period or a link to one of the a at least one future time period, wherein selection of the link to the current time period causes the job to be processed at the current time and wherein selection of the link to the one of the at least one future time period causes scheduling the job during the selected one of the at least one future time period.

14. The computer program product of claim 13, wherein the pricing matrix includes an increased price as compared to a default price or a decreased price as compared to the default price for a specific period of time.

15. The computer program product of claim 13, wherein the real-time utilization data comprises at least one of CPU usage data, memory utilization data, network traffic data, and storage capacity data.

16. The computer program product of claim 13, wherein future cloud computing resource utilization is predicted for a plurality of intervals making up the at least one future time period.

17. The computer program product of claim 16, wherein the program code includes instructions to determine whether the predicted future cloud computing resource utilization is above a predetermined threshold for at least one of the plurality of intervals.

18. The computer program product of claim 17, wherein a price is adjusted only for the at least one of the plurality of intervals having the predicted future cloud computing resource utilization above the predetermined threshold.

19. The computer program product of claim 13 wherein the set of scheduled jobs includes (1) at least one job submitted to a queue comprising a list of jobs to be processed by the cloud computing resources and (2) at least one anticipated job.

20. The computer program product of claim 13, wherein the plurality of prices in the pricing matrix are fixed prices after the pricing matrix has been transmitted to the one or more computing devices requesting utilization of the cloud computing resources.

\* \* \* \* \*